US012110892B2

(12) United States Patent
Hondred et al.

(10) Patent No.: US 12,110,892 B2
(45) Date of Patent: Oct. 8, 2024

(54) SYSTEM AND METHODOLOGY COMPRISING COMPOSITE STATOR FOR LOW FLOW ELECTRIC SUBMERSIBLE PROGRESSIVE CAVITY PUMP

(71) Applicant: Schlumberger Technology Corporation, Sugar Land, TX (US)

(72) Inventors: Peter Hondred, De Soto, KS (US); Jason Holzmueller, Lawrence, KS (US); William Goertzen, Lawrence, KS (US); Maxim Pushkarev, Lawrence, KS (US)

(73) Assignee: Schlumberger Technology Corporation, Sugar Land, TX (US)

(*) Notice: Subject to any disclaimer, the term of this patent is extended or adjusted under 35 U.S.C. 154(b) by 53 days.

(21) Appl. No.: 18/041,414

(22) PCT Filed: Aug. 20, 2021

(86) PCT No.: PCT/US2021/046899
§ 371 (c)(1),
(2) Date: Feb. 13, 2023

(87) PCT Pub. No.: WO2022/040522
PCT Pub. Date: Feb. 24, 2022

(65) Prior Publication Data

US 2023/0313794 A1 Oct. 5, 2023

Related U.S. Application Data

(60) Provisional application No. 63/068,430, filed on Aug. 21, 2020.

(51) Int. Cl.
*F04C 2/107* (2006.01)
*F04C 13/00* (2006.01)

(52) U.S. Cl.
CPC .......... *F04C 2/1075* (2013.01); *F04C 13/008* (2013.01); *F04C 2230/60* (2013.01); *F05C 2225/02* (2013.01)

(58) Field of Classification Search
CPC ...... F04C 2/1075; F04C 13/06; F04C 230/60; F05C 25/02
See application file for complete search history.

(56) References Cited

U.S. PATENT DOCUMENTS 4,548,567 A 10/1985 Missout
4,806,086 A 2/1989 Bloch
(Continued)

FOREIGN PATENT DOCUMENTS

WO 2016089938 A1 6/2016
WO 2022006240 A1 1/2022

OTHER PUBLICATIONS

Screw, Thread at https://en.wikipedia.org/wiki/Screw_thread#Lead, pitch,_and_starts, Downloaded on Dec. 4, 2022 (17 pages).
(Continued)

*Primary Examiner* — Thomas Fink
(74) *Attorney, Agent, or Firm* — Jeffrey D. Frantz

(57) ABSTRACT

A technique facilitates efficient well production in relatively low volume applications, e.g. applications after well pressure and volume taper off for a given well. According to an embodiment, use of an electric submersible progressive cavity pump is enabled in harsh, high temperature downhole environments. A pump stator facilitates long-term use in such harsh environments by providing a composite structure having an outer housing and a thermoset resin layer located within the outer housing and secured to the outer housing. The thermoset resin layer is constructed with an internal surface having an internal thread design. Additionally, an elastomeric layer is located within the thermoset resin layer and has a shape which follows the internal thread. In this
(Continued)

manner, the elastomeric layer is able to provide an interior surface generally matching the shape of the internal thread of the thermoset resin layer and arranged for interaction with a corresponding pump rotor.

19 Claims, 5 Drawing Sheets

(56) References Cited

U.S. PATENT DOCUMENTS

| | | | | | |
|---|---|---|---|---|---|
| 5,171,138 | A | 12/1992 | Forrest | | |
| 5,759,019 | A | 6/1998 | Wood | | |
| 6,162,032 | A | 12/2000 | Jager | | |
| 6,336,796 | B1 | 1/2002 | Cholet | | |
| 6,604,921 | B1 | 8/2003 | Plop | | |
| 6,604,922 | B1 | 8/2003 | Hache | | |
| 7,083,401 | B2 | 8/2006 | Hooper | | |
| 7,517,202 | B2 | 4/2009 | Delpassand | | |
| 7,739,792 | B2 | 6/2010 | Lee | | |
| 7,896,628 | B2 | 3/2011 | Sindt | | |
| 2001/0005486 | A1 | 6/2001 | Wood | | |
| 2005/0089429 | A1* | 4/2005 | Delpassand | F04C 13/008 | 418/48 |
| 2005/0260407 | A1 | 11/2005 | Anand | | |
| 2006/0131079 | A1 | 6/2006 | Bottos | | |
| 2006/0153724 | A1* | 7/2006 | Delpassand | F04C 2/1075 | 418/45 |
| 2007/0295510 | A1* | 12/2007 | Liu | E21B 43/128 | 166/370 |
| 2008/0023863 | A1 | 1/2008 | Lee | | |
| 2009/0169364 | A1 | 7/2009 | Downton | | |
| 2011/0116960 | A1* | 5/2011 | Akbari | F04C 2/1075 | 418/48 |
| 2013/0052067 | A1 | 2/2013 | Hohl | | |
| 2013/0118247 | A1* | 5/2013 | Akbari | F04C 2/1075 | 156/244.11 |
| 2015/0110643 | A1 | 4/2015 | Liu | | |
| 2015/0184498 | A1 | 7/2015 | Twidale | | |
| 2021/0288541 | A1 | 9/2021 | Madbouly | | |

OTHER PUBLICATIONS

International Search Report and Written Opinion issued in PCT Application PCT/US2021/039840, dated Oct. 27, 2021 (10 pages).
International Search Report and Written Opinion issued in PCT Application PCT/US2021/046899, dated Dec. 1, 2021 (11 pages).
Progressing cavity pump, downloaded on Jan. 20, 2023 from link https://en.wikipedia.org/wiki/Progressive_cavity_pump (4 pages).
Downhole PC pumps, downloaded on Jan. 20, 2023 from link https://petrowiki.spe.org/Downhole_PC_pumps (9 pages).
Progressing cavity pump (PCP) systems, downloaded on Jan. 20, 2023 from link https://petrowiki.spe.org/Progressing_cavity_pump_(PCP)_systems.

* cited by examiner

SYSTEM AND METHODOLOGY COMPRISING COMPOSITE STATOR FOR LOW FLOW ELECTRIC SUBMERSIBLE PROGRESSIVE CAVITY PUMP

CROSS-REFERENCE TO RELATED APPLICATIONS

Any and all application for which a foreign or domestic priority claim is identified in the Application Data Sheet as filed with the present application are hereby incorporated by reference under 37 CFR 1.57. The present application is a national stage entry under 35 U.S.C. 371 of International Application No. PCT/US2021/046899, filed Aug. 20, 2021, which claims priority benefit of U.S. Provisional Application No. 63/068,430, filed Aug. 21, 2020, the entirety of which is incorporated by reference herein and should be considered part of this specification.

BACKGROUND

In many well applications, electric submersible pumps (ESPs) are deployed downhole to provide artificial lift for lifting oil to a collection location. An ESP has a series of centrifugal pump stages contained within a protective housing and mated to a submersible electric motor. The ESP may be installed at the end of a production string and is powered and controlled via an armor protected cable. Electric submersible pumps may be used in a variety of moderate-to-high-production rate wells, however each ESP is designed for a specific well and for a relatively tight range of pumping rates.

As the well pressure and volume taper off, the ESP can begin to operate outside of the specified range. This results in substantial reductions in system efficiencies and can lead to major mechanical problems, excessive energy costs, and premature pumping system failure. When the efficiency of the pump has been reduced, an operator may transition to a low flow solution such as a sucker rod pump or similar system which can accommodate the lower production volumes. However, such low flow systems have relatively limited applications and often cannot be deployed in unconventional deviated wells, e.g. horizontal wells.

SUMMARY

In general, a system and methodology are provided for facilitating efficient well production in relatively low volume applications, e.g. applications after well pressure and volume taper off for a given well. According to an embodiment, use of an electric submersible progressive cavity pump is enabled in harsh, high temperature downhole environments. Long-term, efficient use of the progressive cavity pump in harsh downhole applications is facilitated with a composite pump stator having an outer housing and a thermoset resin layer located within the outer housing and secured to the outer housing. The thermoset resin layer is constructed with an internal surface having an internal thread design. Additionally, an elastomeric layer is located within the thermoset resin layer and has a shape which follows the internal thread. In this manner, the elastomeric layer is able to provide an interior surface generally matching the shape of the internal thread of the thermoset resin layer. The arrangement of the layers and the materials selected for the layers provide a composite structure which has great longevity in harsh, high temperature downhole environments while providing an appropriate surface for creating pumping cavities with a corresponding pump rotor.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
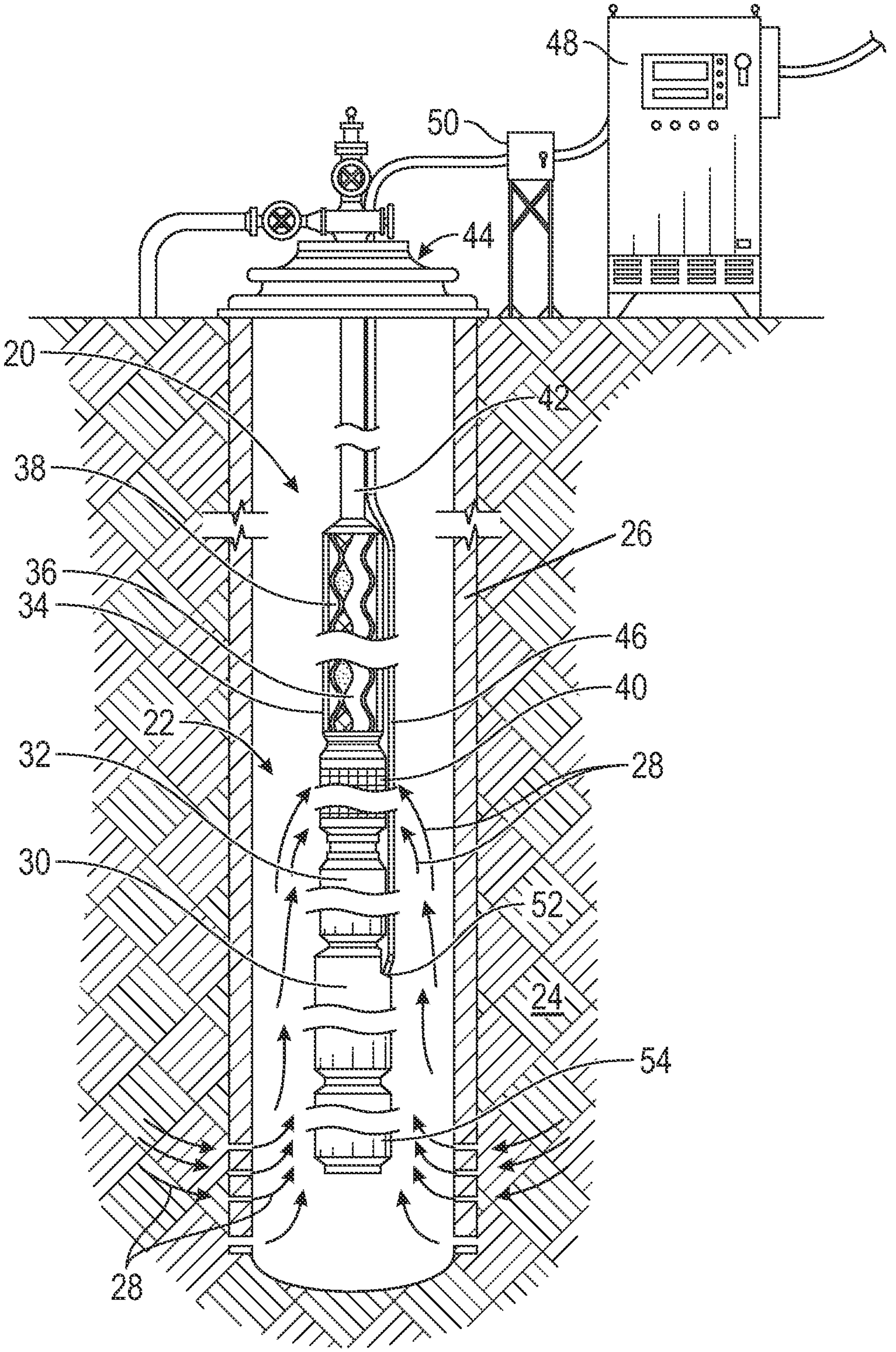
FIG. 1 is a schematic illustration of an example of an electric submersible progressive cavity pumping system having a progressive cavity pump and being deployed downhole in a borehole, e.g. a wellbore, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology for facilitating efficient well production in relatively low volume applications, e.g. applications after well pressure and volume taper off for a given well. According to an embodiment, use of an electric submersible progressive cavity pump is enabled in harsh, high temperature downhole environments. In some applications, an ESP system may initially be used to pump fluid, e.g. oil, from the well while the volume of flow is moderate to high. However, after the volume of flow tapers off and the ESP efficiency drops a sufficient degree, the ESP system is then removed and replaced by the electric submersible progressive cavity pump. Substitution of the electric submersible progressive cavity pump provides a seamless way for continuing efficient production. As explained in greater detail below, the electric submersible progressive cavity pump is constructed for long-term use even in the high temperature, harsh downhole environment.

Long-term, efficient use of the progressive cavity pump in harsh downhole environments is facilitated with a composite pump stator. The composite stator can include an outer housing and a thermoset resin layer located within the outer housing and secured to the outer housing. The thermoset resin layer is constructed with an internal surface having an internal thread design, e.g. a helical thread design. Additionally, an elastomeric layer is located within (e.g., radially within and/or on or adjacent an inner surface of) the thermoset resin layer and has a shape which follows the internal thread. In this manner, the elastomeric layer is able to provide an interior surface generally matching the shape of the internal thread of the thermoset resin layer. The arrangement of the layers and the materials selected for the layers provide a composite stator structure which has great longevity in harsh, high temperature downhole environments while providing an appropriate surface for creating pumping cavities along which fluid is pumped when an internal rotor is rotated relative to the composite pump stator. The inner elastomer layer may be initially formed as an extruded tube which is then inserted into an interior of the intermediate thermoset layer. The extruded tube conforms to the thread pattern and provides an enhanced surface interface with the rotor.

According to an embodiment, the electric submersible progressive cavity pump system combines a progressive cavity pump with a motor and a gearbox which are all submersible and may be fully submersed downhole. This allows the electric submersible progressive cavity pump system to be constructed as a drop-in replacement for an ESP and to utilize the same surface equipment. As a result, continued production can be maintained on a cost effective basis. Additionally, use of a progressive cavity pump enables use of the overall electric submersible progressive cavity pump system in a wide variety of wells including unconventional deviated wells, e.g. horizontal wells.

Referring generally to FIG. 1, an example of an electric submersible progressive cavity pump system 20 is illustrated as deployed in a borehole 22, e.g. a wellbore. In this embodiment, the wellbore 22 is drilled into a subterranean formation 24 and, in some applications, may be lined with casing 26. Perforations are formed through the casing 26 and out into the surrounding formation 24 to enable the inflow of oil 28 and/or other fluids which may then be pumped to a collection location via the electric submersible progressive cavity pump system 20.

According to the example illustrated, the electric submersible progressive cavity pump system 20 may comprise a submersible motor 30, e.g. an induction motor or a PMM (permanent magnet motor), a submersible gearbox 32 driven by the motor 30, and a progressive cavity pump 34 driven via the gearbox 32. The progressive cavity pump 34 may comprise a rotor 36 rotatably positioned within a surrounding composite stator 38. The motor 30 and gearbox 32 may be used to drive/rotate the rotor 36 within the composite stator 38 to pump fluid, e.g. oil 28. For example, the oil 28 entering wellbore 22 may be drawn in through a pump intake 40 and pumped via progressive cavity pump 34 up through a tubing 42, e.g. a production tubing. From tubing 42, the pumped fluid may be directed through a wellhead 44 to an appropriate surface collection location.

Electric power may be provided downhole to the submersible motor 30 via a power cable 46. In the example illustrated, the power cable 46 is routed along the tubing 42 and connected with a power source 48, e.g. a variable speed drive or switchboard, via a cable junction box 50. However, appropriate electrical power may be provided to the downhole motor 30 via various types of power supply systems. The power cable 46 is connected to the motor 30 by a sealed motor electrical connector 52.

Depending on the parameters of a given application, the electric submersible progressive cavity pump system 20 may comprise a variety of other components and/or may be coupled with a variety of other components and systems. By way of example, various shaft seals, motor protectors, and other components may be connected with, or integrated into, the motor 30 and/or gearbox 32. In the illustrated example, a lower component 54 is coupled with motor 30 on a downhole side of the motor 30. By way of example, the lower component 54 may be an oil compensator or a base gauge. However, many other types of components and systems may be connected with or used in combination with the electric submersible progressive cavity pump system 20.

Figure 2:
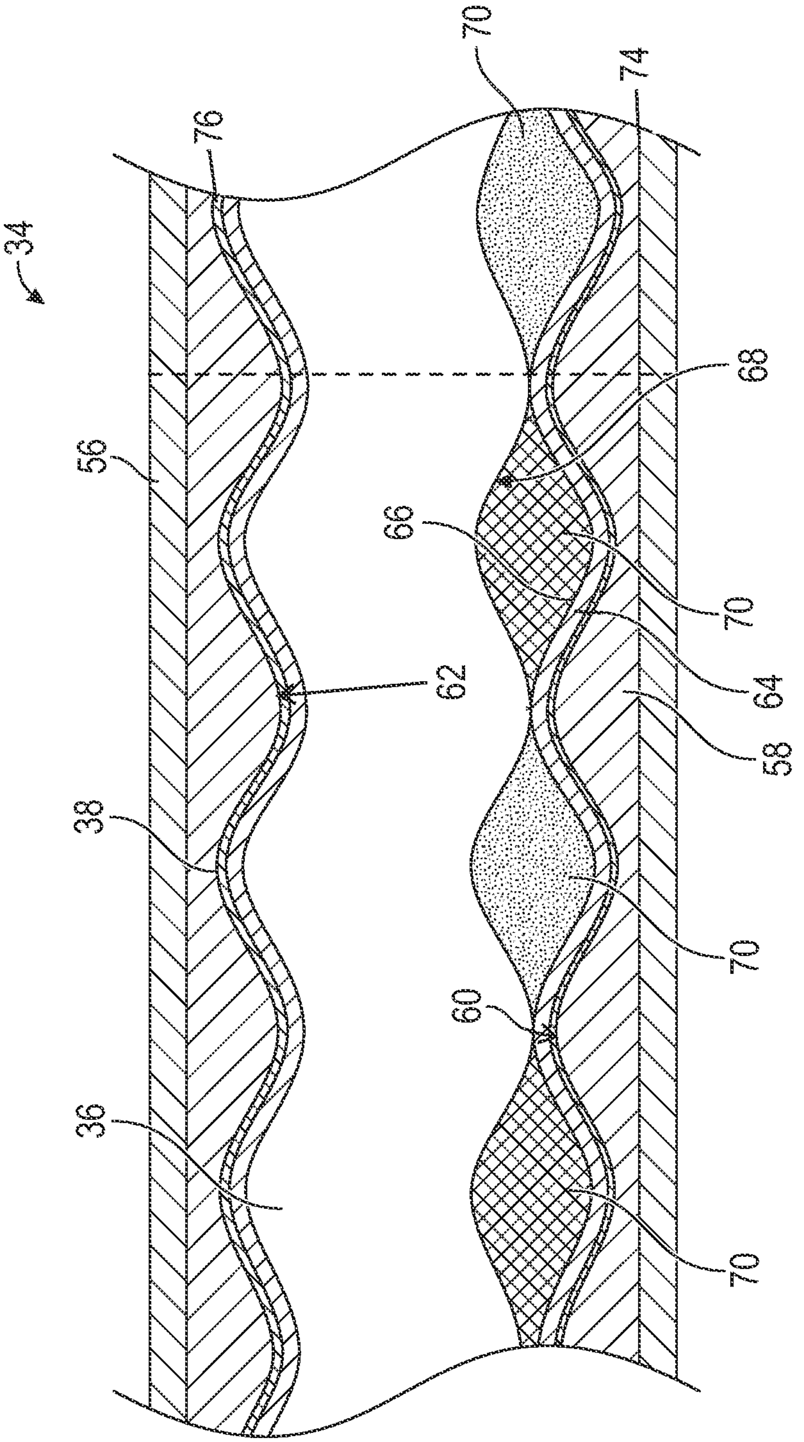
FIG. 2 is a cross-sectional view of an example of a progressive cavity pump, according to an embodiment of the disclosure.

With additional reference to FIG. 2, an embodiment of the composite stator 38 of progressive cavity pump 34 comprises an outer housing 56, e.g. a metal outer housing, and a first layer 58 located within (e.g., radially within) the outer housing 56. The first layer 58 may be formed from a thermoset resin and may be secured to the outer housing 56 along an interior surface of the outer housing 56. The first layer 58 is molded or otherwise constructed to have an interior surface 60 formed as an internal thread 62. For example, the internal thread 62 may be formed as a helical thread (see also FIGS. 3 and 4).

The illustrated composite stator 38 further comprises a second layer 64 located within (e.g., radially within and/or on or adjacent an inner surface of) first layer 58. The second layer 64 can be secured to the first layer 58 along the internal thread 62. The second layer 64 may be formed from an elastomer in a shape which follows the internal thread 62 such that a second layer interior surface 66 generally matches the shape of the first layer interior surface 60. In other words, the interior surface 66 of second layer 64 also presents an internal thread construction, e.g. a helical internal thread, which provides an operational interface with rotor 36. The thread configuration of interior surface 66 and a corresponding thread shaped exterior 68 of rotor 36 (see also FIG. 5) are constructed to create progressing cavities 70 along composite stator 38 as rotor 36 is rotated relative to composite stator 38. As with conventional progressive cavity pumps, rotation of rotor 36 causes these progressing stator cavities 70 to move fluid, e.g. oil 28, along the composite stator 38 until discharged, e.g. discharged into tubing 42. Thus, the elastomer layer 64 is the primary stator elastomer against which the rotor 36 rotates.

Referring again to FIGS. 3 and 4, the various layers of composite stator 38 may be constructed from various types of materials, as described in greater detail below. However, the layer materials as well as the materials/mechanisms for securing the multiple layers together are selected to enable operation at high temperatures and in aggressive fluid environments for long durations. As a result, the composite stator 38 enables long-term operation of the electric submersible progressive cavity pump system 20 in downhole environments.

Figure 3:
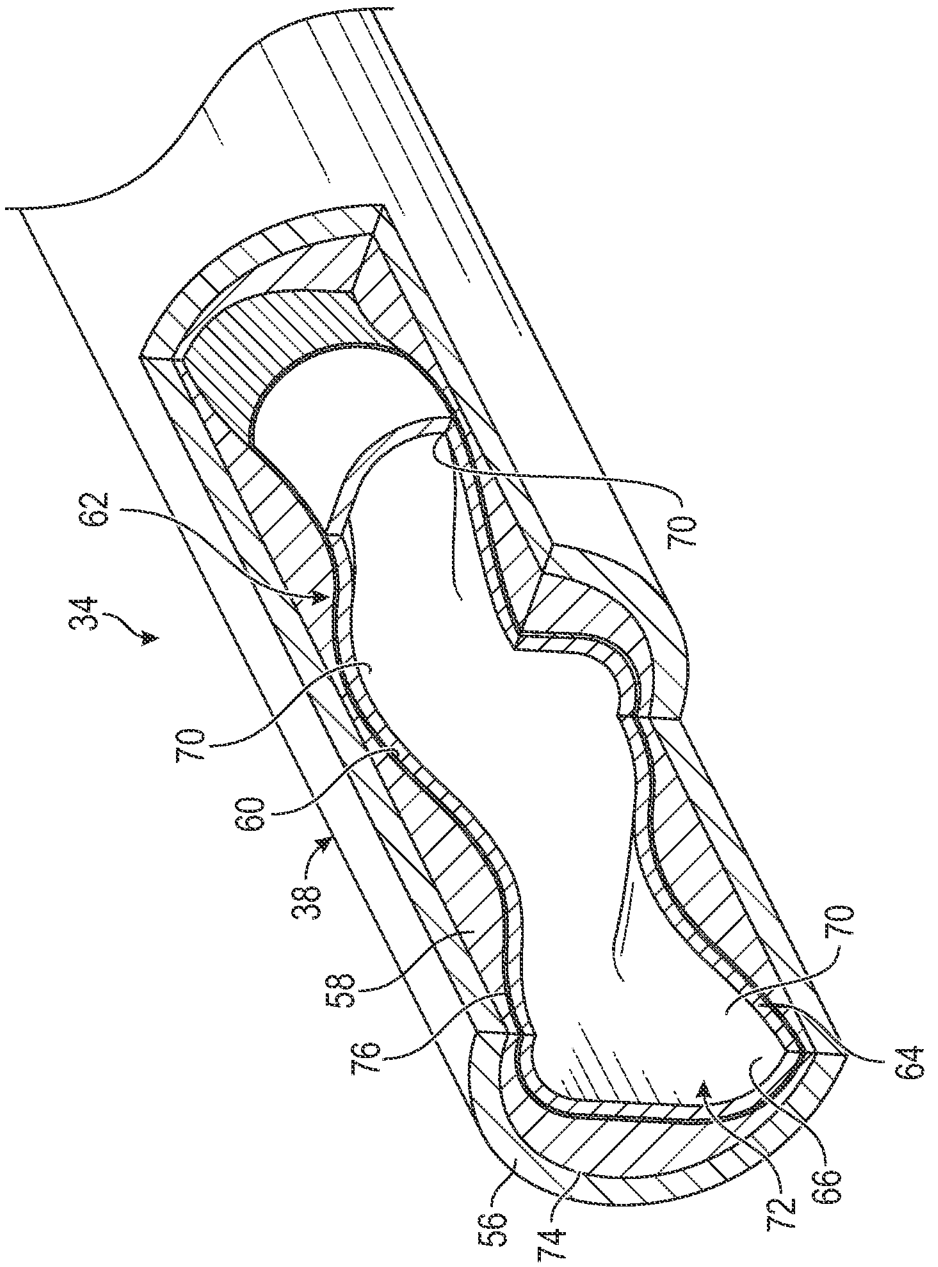
FIG. 3 is an orthogonal view of an example of a progressive cavity pump composite stator for use with an electric submersible progressive cavity pump, the composite stator illustration being partially broken away to show examples of composite layers, according to an embodiment of the disclosure.
Figure 4:
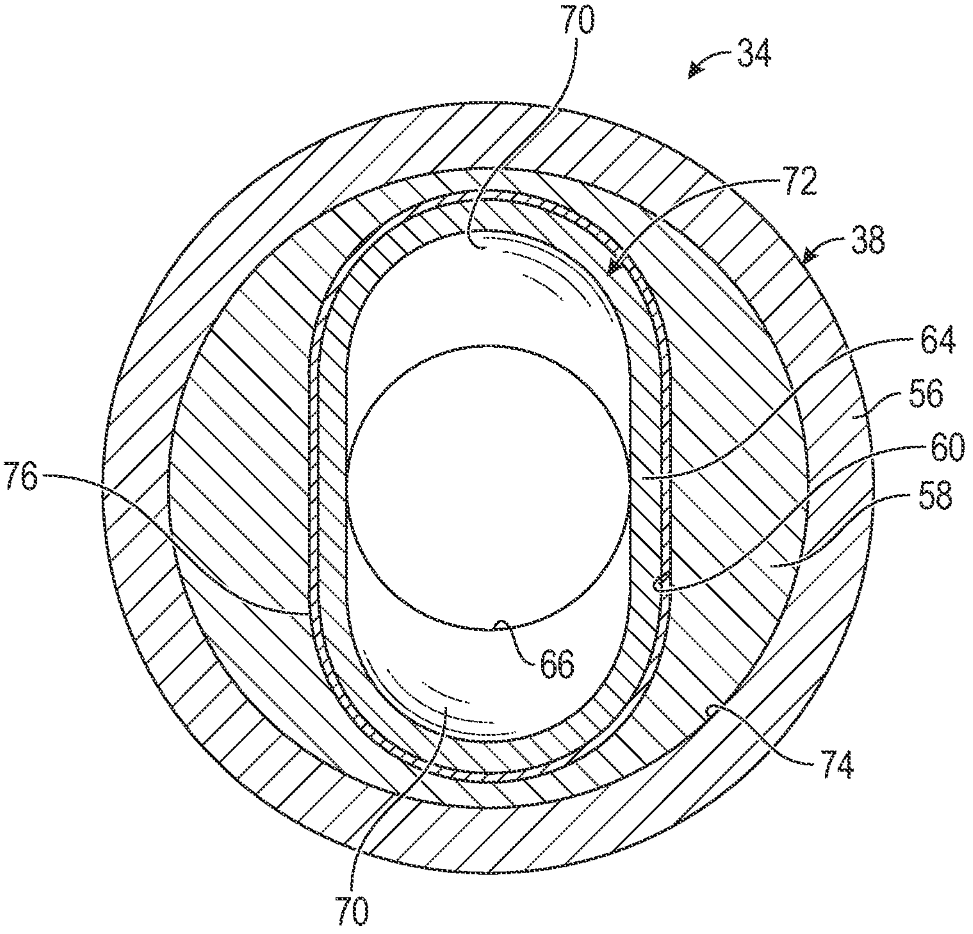
FIG. 4 is an end view of an example of a composite stator, according to an embodiment of the disclosure.

In the example illustrated in FIGS. 3 and 4, the outer housing/layer 56 may be constructed from metal or other suitable material able to withstand downhole conditions. By way of example, the outer housing 56 may be constructed from various carbon steels or stainless steels. However, the outer housing 56 also may be constructed from materials such as ni-resist, nickel alloys, or other suitable materials.

With respect to the first layer 58, this layer may be constructed from a thermoset resin which may be formulated in various thermoset composites. For example, the first layer 58 may be a structural thermoset resin having a glass transition temperature greater than a desired final application temperature. Additionally, the structural thermoset resin should be capable of bonding completely with a bonding layer as discussed in greater detail below. The thermoset resin layer 58 may be constructed, e.g. molded, from a thermosetting epoxy base system having a high glass transition temperature (Tg) and good resistance to downhole conditions. One example is a thermosetting epoxy comprising CoolTherm EL-636 resin available from Parker LORD.

However, various types of epoxies may be formed from a variety of thermoset resins for use in constructing the first layer 58 and the internal thread shape. Examples of such thermoset resins and suitable materials for first layer 58 include bismaleimide, cyanate esters, preceramic thermosets, phenolics, novalacs, dicyclopentadiene-type systems, or other thermoset materials with sufficient Tg and bonding capability.

To further improve performance of the first layer 58 in various harsh operating conditions, various additives may be combined into the thermoset resin. For example, fillers may be incorporated into the thermoset resin to improve heat dissipation and to reduce the coefficient of thermal expansion (CTE). Examples of suitable fillers include mineral particles, metal powder, ceramic or organic particles, silica, alumina fillers, aluminum metal particles, or other suitable metal particles. Additionally, adhesion promoting additives may be combined into the thermoset resin layer 58 to enhance bonding to adjacent layers. In some embodiments, rubberized additives may be added to the thermoset resin layer 58 to increase toughness/fracture resistance. This could involve blending a certain amount of elastomer into the thermoset material. Various other additives may be combined to, for example, promote compatibility with the adjacent elastomer layer 64.

In the example illustrated in FIGS. 3 and 4, the second layer 64 is an elastomer layer formed as an extruded tube 72. The extruded tube 72 is inserted or positioned along the interior of the first layer 58 and is sufficiently pliable to conform to the shape of internal thread 62 so as to present its interior surface 66 in a corresponding thread pattern, e.g. a helical thread pattern. By way of example, the second layer 64 may be formed with a generally constant wall thickness.

The extruded tube 72 or other types of second layer 64 may be formed from a variety of elastomers, e.g. rubbers, able to provide the desired contact and interaction with the rotor 36. The materials selected to form elastomer layer 64 also are resistant to downhole conditions, e.g. resistant to well fluids and downhole temperatures. Specific compounds may be optimized for good dynamic properties, low hysteresis, and high tensile and tear strength.

By forming the second layer 64 as an extruded tube 72, much higher viscosities can be tolerated. As a result, elastomer materials having much higher strength may be selected so as to provide a substantially greater resistance to damage. Examples of suitable elastomer materials for construction of second layer 64/extruded tube 72 include nitrile rubber (NBR), hydrogenated nitrile rubber (HNBR), and FKM fluoroelastomer, e.g. VITON™ available from The Chemours Company or Fluorel™ available from Dyneon LLC. For very high heat applications, e.g. greater than 180° C., the second layer 64/extruded tube 72 may be constructed from materials such as tetrafluoroethylene propylene (e.g. FEPM) or VITON™ Extreme™ fluoroelastomer products available from The Chemours Company.

For example as shown in the example illustrated in FIGS. 3 and 4, the composite stator 38 may further comprise a bonding layer 74 located between the outer housing 56 and the first layer 58 and/or a middle bonding layer 76 located between the first layer 58 and the second layer 64. The bonding layer 74 may comprise a variety of materials and/or structures which are able to secure the thermoset resin of first layer 58 to the surrounding housing 56, e.g. metal housing. By way of example, the bonding layer 74 may comprise various adhesives which remain functional in the hot, harsh downhole environment. However, the bonding layer 74 also may comprise physical elements and may be formed with a molded fit, a press fit, or another type of friction fit between the first layer 58 and the surrounding outer housing 56.

With respect to bonding layer 76, this bonding layer may similarly use a variety of materials. According to an embodiment, the bonding layer 76 comprises an elastomer compound which may use the same base polymer as the elastomer of second layer 64 or other suitable variants. For example, if the elastomer layer 64 is formed from nitrile rubber with 40% acrylonitrile (ACN), the bonding layer 76 may use a similar material but with 30% ACN. However, the bonding layer 76 also can be formulated with a different type of elastomer that is at least partially compatible, e.g. forming bonding layer 76 with ethylene propylene diene monomer (EPDM) while the primary elastomer of second layer 64 is formed with hydrogenated nitrile rubber (HNBR).

In a variety of applications, the bonding layer 76 is formulated with an elastomer material capable of coextrusion and co-crosslinking with the elastomer of elastomer layer 64. Accordingly, both the bonding layer 76 and the elastomer layer 64 may be capable of using the same type of cross-linking system, although the bulk of each elastomer may use different curing systems. To facilitate longevity downhole in certain applications, the formulation of bonding layer 76 may be optimized for bonding instead of, for example, dynamic loading and high tensile strength.

Accordingly, embodiments of bonding layer 76 may utilize components and techniques known to facilitate bonding between the thermoset resin layer 58 and the elastomer layer 64. Examples of such components/techniques include using hot polymerized nitrile rubber and/or use of fillers that promote bonding, e.g. fumed and precipitated silica, diatomaceous earth, or other mineral fillers. Additional examples include the use of metal oxides that promote bonding. Such metal oxides tend to be elastomer dependent but may include zinc oxide, aluminum oxide, lead oxides, calcium oxides, magnesium oxides, iron oxides, and other suitable metal oxides.

Additional components and techniques which facilitate bonding include the use of a base polymer in bonding layer 76 with increased unsaturation (higher residual double bond content). Adhesion promoting additive polymers with high unsaturation, e.g. RICON™ 154 90% vinyl polybutadiene, also may be used in formulating bonding layer 76. There also are many multifunctional additives which promote adhesion and include, for example, maleated polybutadiene, methacrylated polybutadiene, epoxidized polybutadiene, acrylated bonding coagents, and various monomer oligomers or polymers having functionality allowing the bonding layer 76 to interact with two different systems presented by the elastomer of layer 64 and the thermoset material of layer 58.

Furthermore, the bonding layer 76 may utilize catalysts, curative agents, or reactive agents which enhance reactivity and bonding with the thermoset composite layer. The bonding layer 76 also may be formulated with various additives or according to manufacturing processes which create increased surface area to further enhance bonding with the adjacent layers, e.g. thermoset layer 58. An example of a manufacturing process which facilitates bonding is extruding the bonding layer 76 with a rough or porous surface. Depending on the material composition of both the elastomer layer 64 and the thermoset layer 58, the material of bonding layer 76 may be selected according to its ability to chemically bond with both layers 58, 64.

By using a thermoset material to form the first layer 58 with internal thread 62/stator cavities 70 and then inserting a second elastomer layer 64, the composite stator 38 is relatively inexpensive to construct. As described above, the construction of elastomer layer 64, e.g. extrusion of elastomer layer 64 as tube 72, in combination with selecting suitable layer materials described herein and bonding elastomer layer 64 to the first layer 58 via bonding layer 76 provides a composite stator 38 which has a high resistance to temperature and well fluid. This allows use of the composite stator 38 over long periods of time in a variety of downhole applications.

Figure 5:
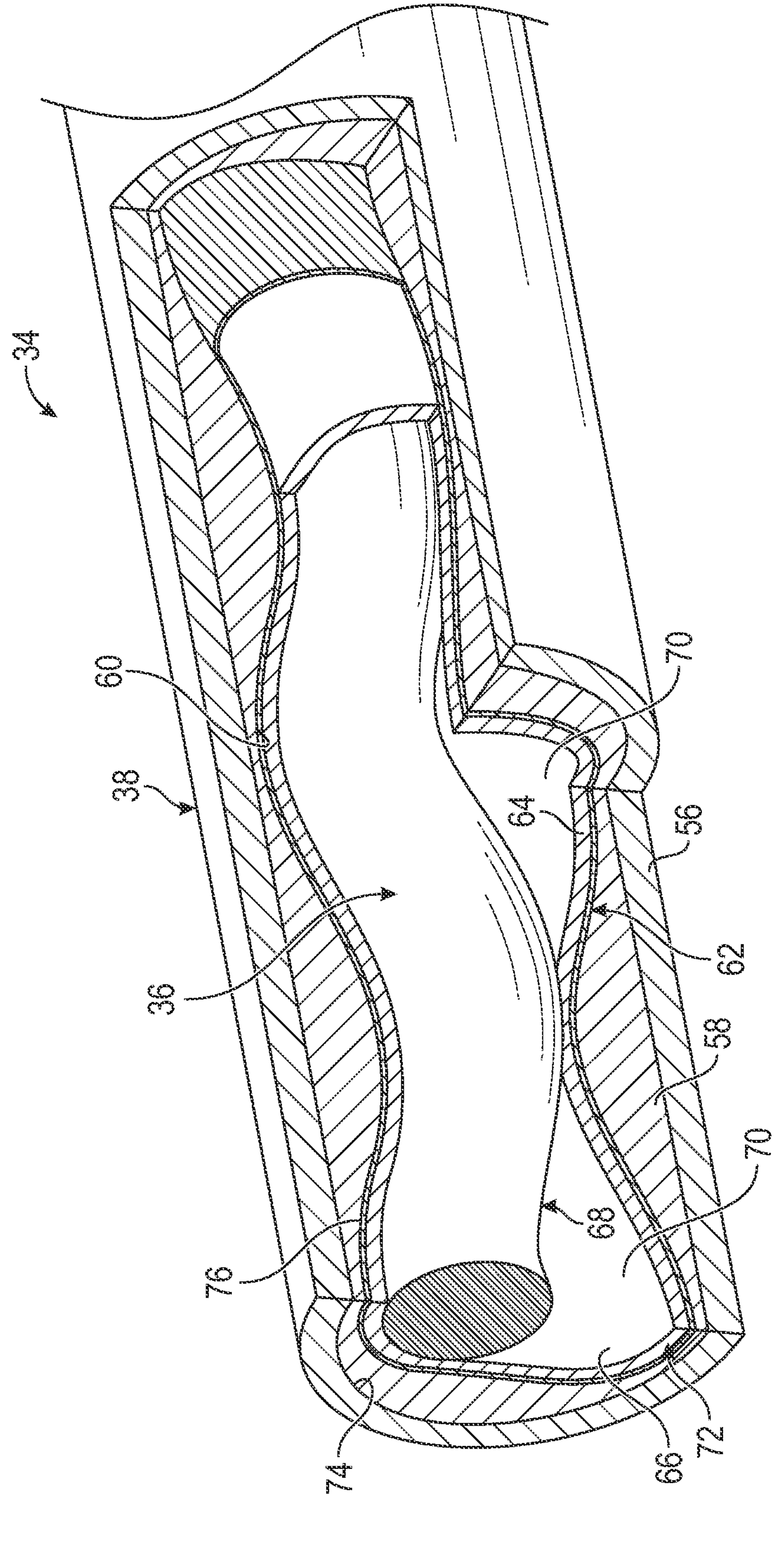
FIG. 5 is an orthogonal view, partially broken away, of an example of a progressive cavity pump composite stator combined with a rotor to form an electric submersible progressive cavity pump, according to an embodiment of the disclosure.

The securely bonded elastomer layer 64 also presents a rugged, long-lasting interior surface 66 for long-term interaction with rotor 36, as illustrated in FIG. 5. Once the rotor 36 is inserted into the composite stator 38 and the overall electric submersible progressive cavity pump system 20 is assembled, the pump system 20 may be deployed downhole into a variety of wellbores 22, including many types of deviated, e.g. horizontal, wellbores for production of oil 28 or other downhole fluids. The electric submersible progressive cavity pumping system 20 may initially be employed as the primary artificial lift system. In a variety of applications, however, a conventional ESP system may initially be employed to pump oil and/or other downhole fluids until well pressure and production rate taper off sufficiently to render the conventional ESP system undesirably inefficient. At that time, the conventional ESP system may be removed and replaced with the electric submersible progressive cavity pump system 20 for efficient well production at a lower flowrate.

The composite structure of stator 38 may be adjusted according to parameters of a given downhole environment and/or pumping application. Additionally, the progressive cavity pump 34 may be constructed in a variety of sizes and configurations. Many types of additional or other components may be incorporated into the overall electric submersible progressive cavity pump system 20 for use in various types and sizes of boreholes, e.g. wellbores.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a borehole, comprising:
- an electric submersible progressive cavity pump system having:
  - a motor;
  - a gearbox driven by the motor; and
  - a progressive cavity pump having a rotor driven by the gearbox and a stator surrounding the rotor, the stator comprising:
    - an outer metal housing;
    - a first layer located within the outer metal housing, the first layer being formed from a thermoset resin secured to the outer metal housing and having a first layer interior surface formed as an internal thread; and
    - a second layer located within the first layer and secured to the first layer along the internal thread, the second layer being formed from an elastomer in a shape which follows the internal thread such that a second layer interior surface generally matches the shape of the first layer interior surface,
  - wherein the second layer is secured to the thermoset resin of the first layer via an elastomer bonding layer located between the elastomer and the thermoset resin, and
  - wherein the elastomer bonding layer comprises a polybutadiene.

2. The system as recited in claim 1, wherein the outer metal housing comprises steel.

3. The system as recited in claim 1, wherein the thermoset resin of the first layer comprises a thermosetting epoxy.

4. The system as recited in claim 3, wherein the second layer is an extruded tube.

5. The system as recited in claim 1, wherein the second layer is an extruded tube comprising at least one of nitrile rubber, hydrogenated nitrile rubber, or fluoroelastomer.

6. The system as recited in claim 1, wherein the thermoset resin is secured to the outer metal housing via a bonding layer between the thermoset resin and the outer metal housing.

7. The system as recited in claim 6, wherein the bonding layer comprises an adhesive.

8. The system as recited in claim 1, wherein the elastomer bonding layer forms a chemical bond with both the thermoset resin and the elastomer of the second layer.

9. The system as recited in claim 1, wherein the internal thread is helical.

10. A method, comprising:
- assembling a stator for an electric submersible progressive cavity pump with a composite structure having an outer housing; a thermoset resin disposed along an interior of the outer housing and presenting an interior surface formed in a helical thread pattern; and an elastomeric layer of generally uniform thickness disposed along the helical thread pattern of the interior surface of the thermoset resin, wherein the elastomeric layer is secured to the thermoset resin via an elastomer bonding layer located between the elastomeric layer and the thermoset resin, the elastomer bonding layer comprising a polybutadiene; and
- inserting a rotor into the stator such that an outer surface of the rotor engages the elastomeric layer and cooperates with the helical thread pattern to create cavities along which a fluid can be pumped when the rotor is rotated relative to the stator.

11. The method as recited in claim 10, further comprising coupling a gearbox to the rotor.

12. The method as recited in claim 11, further comprising connecting a motor to the gearbox.

13. The method as recited in claim 12, further comprising deploying the stator, the rotor, the gearbox, and the motor downhole into a borehole.

14. The method as recited in claim 13, further comprising operating the rotor within the stator to pump oil from downhole.

15. The method as recited in claim 13, wherein deploying comprises replacing an electric submersible pumping system.

16. The method as recited in claim 10, further comprising forming the thermoset resin from a thermosetting epoxy.

17. The method as recited in claim 10, further comprising forming the elastomeric layer as an extruded tube.

18. A system, comprising:

a composite stator for use in an electric submersible progressive cavity pump, the composite stator comprising:

an outer housing;

a thermoset resin layer located within the outer housing and secured to the outer housing, the thermoset resin layer having an internal surface formed as an internal thread; and an elastomeric layer located within the thermoset resin layer, the elastomeric layer being formed as an extruded tube of generally uniform thickness, the extruded tube being positioned within the thermoset resin layer so as to have a shape which follows the internal thread, wherein the elastomeric layer is secured to the thermoset resin layer via an elastomer bonding layer located between the elastomeric layer and the thermoset resin layer, and wherein the elastomer bonding layer comprises a polybutadiene.

19. The system as recited in claim 18, further comprising a rotor rotatably mounted within the elastomeric layer such that rotation of the rotor causes a pumping action along cavities created by the shape of the internal thread.

* * * * *